March 12, 1940.    C. R. HANNA    2,193,591
SHOCK ABSORBER
Filed Aug. 6, 1932    5 Sheets-Sheet 1

WITNESSES:
Fred C. Rilhauer
George V. Woodling

INVENTOR
Clinton R. Hanna
BY
A. H. Eschholz
ATTORNEY

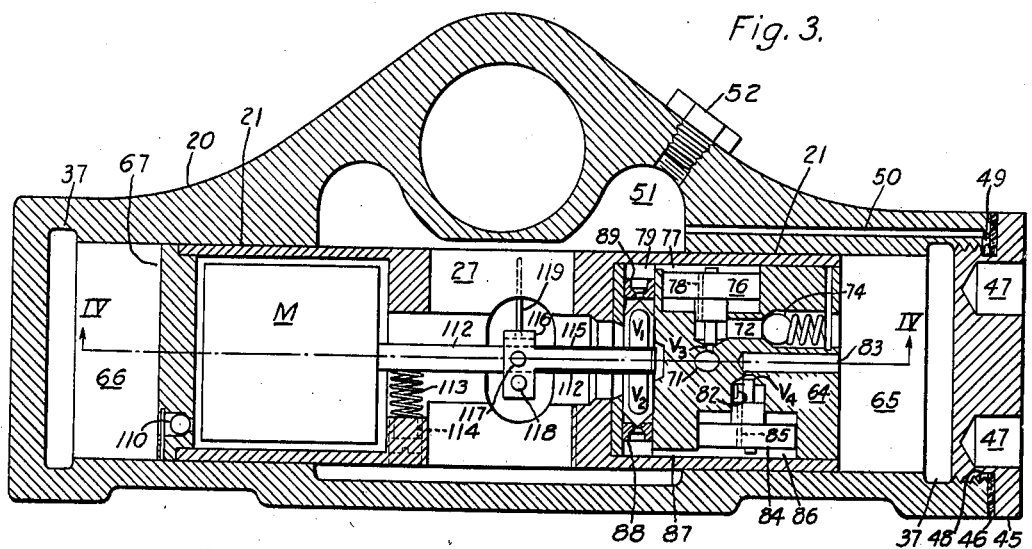

March 12, 1940.          C. R. HANNA          2,193,591
SHOCK ABSORBER
Filed Aug. 6, 1932          5 Sheets-Sheet 3

WITNESSES:
Fred C. Pelham
George V. Woodling

INVENTOR
Clinton R. Hanna
BY
A. H. Eschholz
ATTORNEY

March 12, 1940.   C. R. HANNA   2,193,591
SHOCK ABSORBER
Filed Aug. 6, 1932   5 Sheets-Sheet 4

WITNESSES:
Fred C. Pilham
George V. Woodling

INVENTOR
Clinton R. Hanna
BY
A. H. Eckholz
ATTORNEY

March 12, 1940.　　　C. R. HANNA　　　2,193,591
SHOCK ABSORBER
Filed Aug. 6, 1932　　　5 Sheets-Sheet 5

WITNESSES:
Fred C. Pilham
George V. Woodling

INVENTOR
Clinton R. Hanna
BY A. H. Eschholz
ATTORNEY

Patented Mar. 12, 1940

2,193,591

UNITED STATES PATENT OFFICE 2,193,591

SHOCK ABSORBER

Clinton R. Hanna, Pittsburgh, Pa., assignor to Westinghouse Electric & Manufacturing Company, East Pittsburgh, Pa., a corporation of Pennsylvania Application August 6, 1932, Serial No. 627,758

13 Claims. (Cl. 188—88)

My invention relates generally to shock absorbers and particularly to shock absorbers for vehicles, including automobiles, locomotives and other rolling stock.

This invention constitutes an improvement over the subject matter disclosed and claimed in my copending applications, Serial Nos. 551,390, filed July 17, 1931, and 564,281, filed September 22, 1931.

In the following description, the operation of my shock absorber will be described in connection with an automobile. However, it is to be understood that my shock absorber may be employed in connection with other elastic systems having relatively movable masses interconnected by a resilient member. Also in this description, the vehicle may be considered as having two main parts, which may, in the interest of clarity, be conveniently referred to as the sprung and the unsprung masses.

The sprung mass comprises that part of the vehicle which is supported by the springs, and the unsprung mass comprises the axle and wheels and any other parts that may be mounted thereon.

An object of my invention is the provision of a shock absorber that shall be reliable, compact, and efficient in operation, and shall be readily manufactured and installed.

A more specific object of my invention is to provide for resisting the relative movement of the sprung and the unsprung masses of a vehicle by a force that is substantially proportional to the rate of change of the vertical velocity of the sprung mass of the vehicle.

It is also an object of my invention to provide for reducing the frequency of the free oscillations of the sprung mass of a vehicle, whereby the periodicity of the unsprung mass is less likely to correspond to the undulations of a road surface.

A more specific object of my invention is to provide for resisting the vertical movements of the sprung mass during periods of increasing vertical velocity of the sprung mass of the vehicle.

It is also an object of my invention to provide shock absorbers which allow free movement of the unsprung mass of a vehicle, whereby the unsprung mass may freely fall into a depression or pass over a raised portion of the road surface without subjecting the sprung mass of the vehicle to any jolts, as would be the case if the shock absorbers did not provide for allowing the free movement of the unsprung mass.

It is a more specific object of my invention to provide for initiating and increasing the rate of absorption of the kinetic energy of the unsprung mass of a vehicle when such unsprung mass reaches its maximum velocity, or at a time slightly thereafter; and for continuously absorbing the kinetic energy from the unsprung mass until the kinetic energy is substantially reduced to zero, thereby insuring improved traction between the wheels of the vehicle and the road surface.

A further object of my invention is to provide for keeping the wheels on the road surface and to thus insure positive and uninterrupted traction of the tires on the road surface, thereby avoiding the bouncing and the spinning of the wheels particularly when braking or when pulling hard in second gear over cobblestones, car tracks, rough brick pavements, or other rough road surfaces.

Another object of my invention is the provision of a shock absorber which distinguishes the movements of the sprung mass from the movements of the unsprung mass and which provides for resisting the vertical movements of the sprung mass by a relatively large force and for resisting the vertical movements of the unsprung mass under all operative conditions with a relatively small force, except under the condition when the tires tend to leave the road surface.

A still further object of my invention is the provision for controlling the operations of a shock absorber by means of a control mass having two degrees of freedom.

Other objects and a fuller understanding of my invention may be had by referring to the following specification taken in connection with the accompanying drawings, in which:

Fig. 3 is a longitudinal and vertical cross sectional view of my shock absorber taken along the line III—III of Fig. 2;

Fig. 4 is a longitudinal and horizontal cross sectional view of my shock absorber taken along the line IV—IV of Fig. 3;

Figure 1:
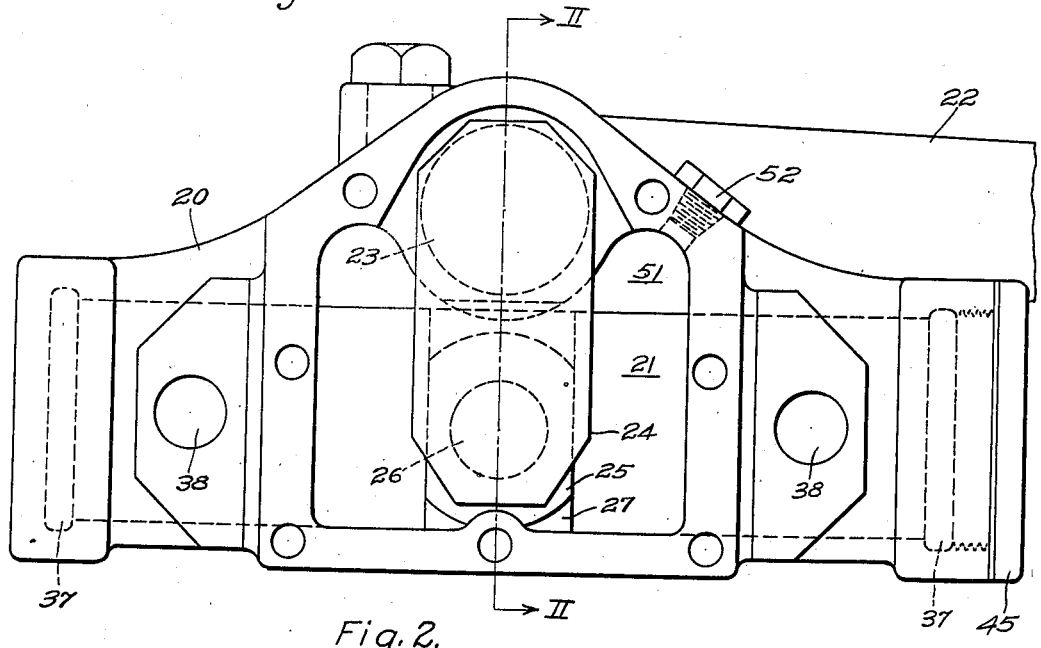
Figure 1 is a side elevational view of a shock absorber embodying the features of my invention, the side assembly plate being removed to show the structural features of the driving crank.

Referring particularly to Figs. 1 to 6, inclusive, of the drawings, my shock absorber comprises, in general, a cylinder 20 which is adapted to be mounted upon the sprung mass of the vehicle, a two-way piston 21 having, as shown, the right end hollowed out to receive a valve assembly block 64 and having the left end hollowed out to receive a control mass M, two multiplying valves mounted within the valve assembly block 64, a plurality of fluid passages and associated ball check valves, a rock shaft 23 operated by an axle arm 22, and a driving crank 24 integrally formed with the rock shaft 23, which, together with a trunnion 26 and a collar 25, actuates the two-way piston 21 within the cylinder 20 upon the relative movements of the sprung and unsprung masses of a vehicle.

In accordance with the usual construction, the cylinder 20 may be mounted upon the sprung mass of a vehicle in any suitable manner. As illustrated in the Figs. 1 and 4, the cylinder 20 is provided with two relatively large threaded openings 38 which are adapted to receive through bolts (not shown) for mounting the cylinder 20 upon the frame of the sprung mass.

Figure 2:
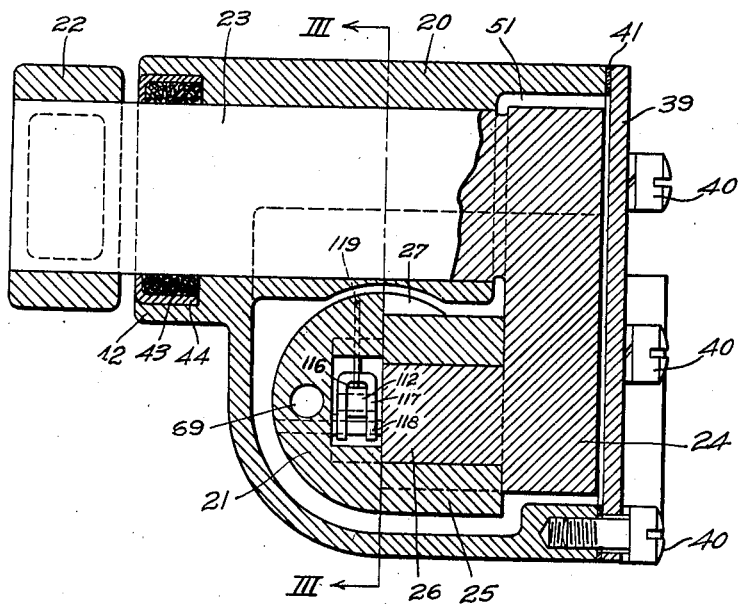
Fig. 2 is a transverse and vertical cross sectional view of my shock absorber taken along the line II—II of Fig. 1.

As best shown in Fig. 2, the cylinder housing 20 extends outwardly towards the axle arm 22 to form a shoulder 42 for the purpose of providing a relatively long bearing surface for the rock shaft 23. As illustrated, the shoulder 42 is recessed to receive packing material 43 which may be securely held in place by means of a retaining washer 44. The purpose of the packing material 43 is to prevent any fluid from escaping around the rock shaft 23. Although the rock shaft 23, the driving crank 24, and the trunnion 26 may be constructed in any suitable manner, I provide for preferably forming the three parts of one integral piece of alloy steel. As best shown in Fig. 2, the depending driving crank 24 is overhung and swings in a space along the side of the two-way piston 21. The driving trunnion 26, having the snugly fitted collar 25, projects inwardly towards the center of the piston 22, and the sides of the driving collar 25 snugly fit between the walls of the recess 27, provided in the central portion of the two-way piston 21, whereby the usual lost motion which takes place between the axle arm and the piston is totally eliminated. Moreover, the employment of an overhanging driving arm not only greatly simplifies the driving connection between the axle arm and the piston of the shock absorber but also greatly facilitates the assembly of the shock absorber.

Therefore, if the sprung and the unsprung masses of a vehicle approach each other, as they will do after the wheel of the vehicle encounters irregularities in the road surface, the driving crank 24 actuates the piston 21 to the right; and when the sprung and unsprung masses of the vehicle separate from each other, the driving crank 24 actuates the piston to the left. In this manner, the piston 21 may operate to resist the relative movements of the sprung and the unsprung masses of a vehicle, regardless of whether the masses are approaching or separating from each other.

As illustrated, the two-way piston 21 is, of course, shorter than the bore of the cylinder 20. Accordingly, this construction provides chambers 65 and 66 on opposite ends of the two-way piston 21 for subjecting a fluid contained therein to pressure to resist the relative movements of the sprung and the unsprung masses of the vehicle. The cylinder 20, at the extreme ends of the bore, is somewhat enlarged at 37 to facilitate the machining of the bore of the piston.

As is obvious, when the piston 21 is moving to the right, the piston chamber 65 becomes a fluid chamber of high pressure and, at the same time, the piston chamber 66 becomes a fluid chamber of low pressure. Conversely, when the piston is moving to the left, the piston chamber 66 becomes a fluid chamber of high pressure and, at the same time, the piston chamber 65 becomes a fluid chamber of low pressure.

In order to provide for the interchange of fluid from the piston chamber of high pressure to the piston chamber of low pressure, the valve assembly block 64 that is mounted within the hollow recess portion of the right end of the piston 21, is provided with a plurality of controllable fluid passages 71, 80 and 101 which lead to a fluid junction 70. At this point communication is made with a longitudinal fluid duct 69 that is provided in the mid-portion of the piston 21 and a fluid tube 68, which leads to the left end of the piston 21 (see Figs. 4, 5 and 6). As shown best in Fig. 4, the right hand end of the fluid tube 68 is snugly pressed at a considerable distance within the fluid duct 69. This relatively long snug fit is provided in order to insure that the fluid, when under high pressure, will not leak around the connection between the fluid tube 68 and the fluid duct 69.

Figure 5:
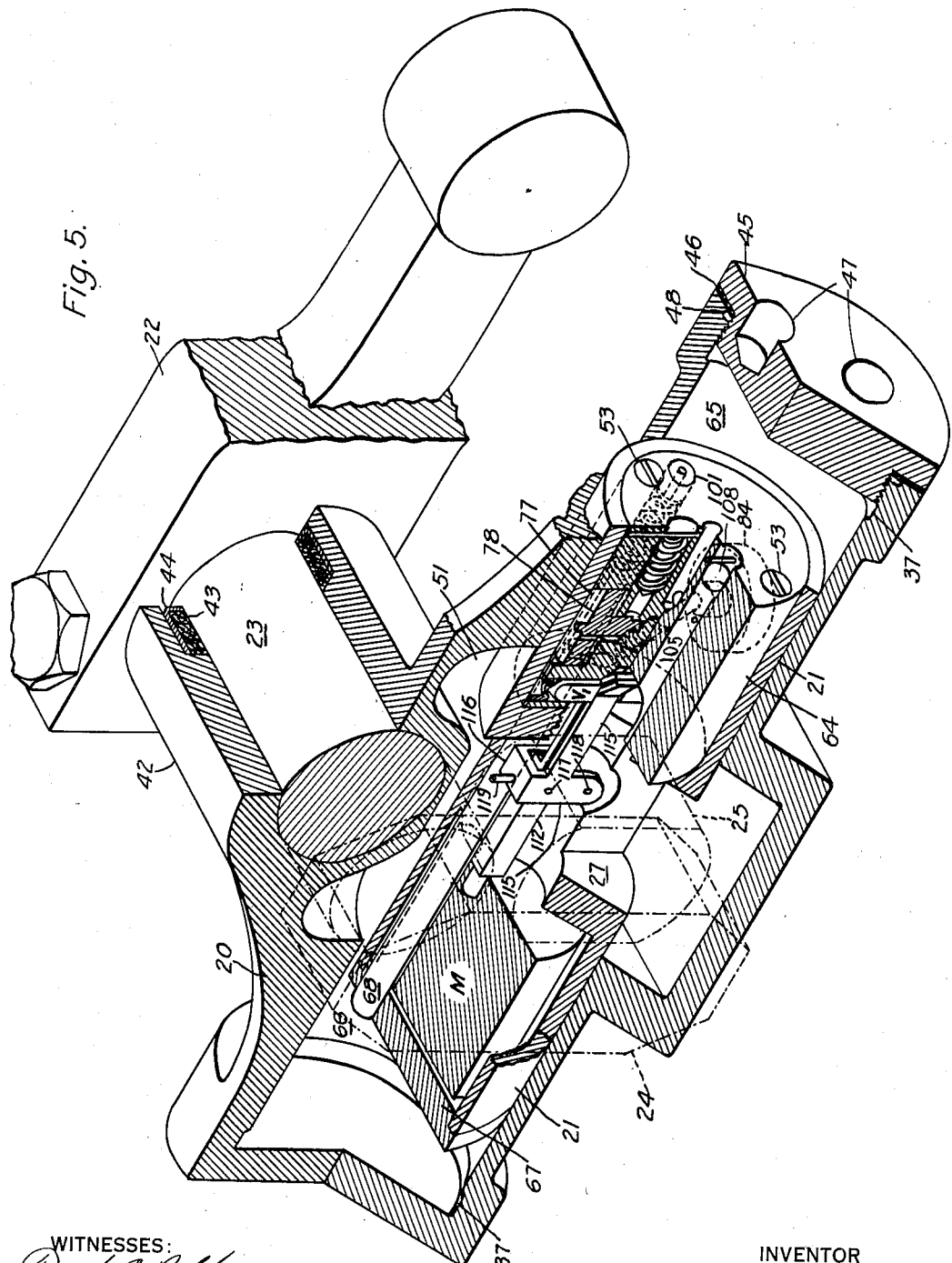
Fig. 5 is a perspective cross sectional view of my shock absorber, the driving crank being shown by dot and dash lines.
Figure 6:
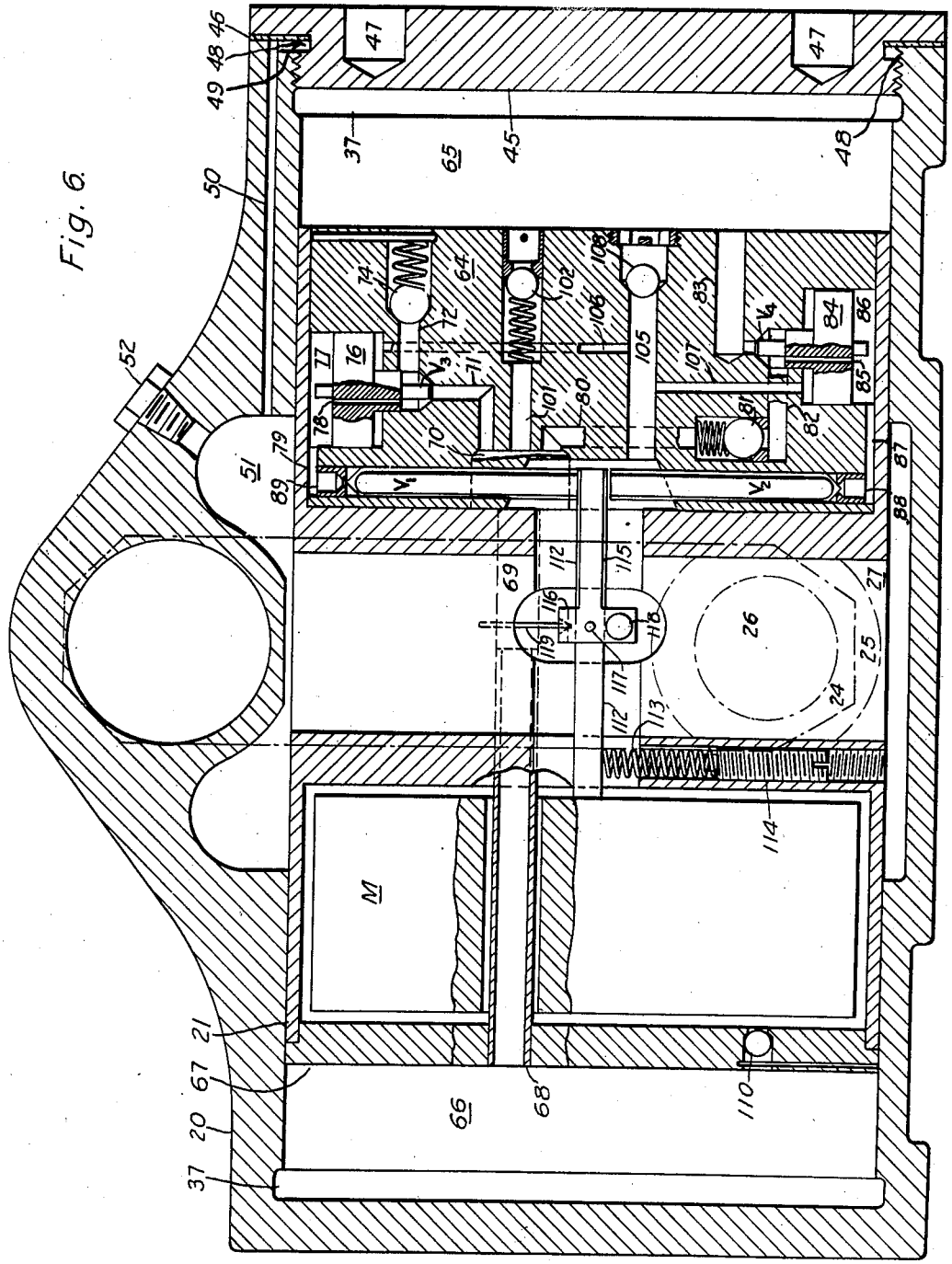
Fig. 6 is an enlarged developed view of my shock absorber wherein the fluid passages, valves and other operating parts, which in the actual construction of the shock absorber are mounted in different planes, are shown in the developed view, for the purpose of clarity, as being mounted in one plane.

For controlling the movement of a fluid through the fluid passages in the valve assembly block, two multiplying valves are provided. As best shown in Figs. 3, 5 and 6, one multiplying valve is mounted at the top of the valve assembly block and the other multiplying valve is mounted in the bottom of the valve assembly block 64. These multiplying valves are identical in structure and operation and will hereinafter be referred to as the upper and the lower multiplying valves. In this embodiment of the invention, the upper multiplying valve comprises the combination of a high pressure valve $V_3$ having a restricted fluid passage 78, and an enlarged piston 76 integrally formed therewith which reciprocates in a cylinder 77, a spring biased ball-check valve 74, and a poppet valve $V_1$ which communicates through a calibrated hole in removable valve seat elements 89 and conduit 79 with the cylinder 77 and which controls the opening and closing of the high pressure valve $V_3$. The passage 78, of course, permits communication between cylinder 77 and the conduit 72 and valve $V_3$. The lower multiplying valve comprises the combination of a high pressure valve $V_4$ having a restricted fluid passage 85, and an enlarged piston 84 integrally formed therewith which reciprocates in a cylinder 86, a spring biased ball-check valve 81, and a poppet valve $V_2$ which communicates through a calibrated hole in removable valve seat element 88 and conduit 87 with the cylinder 86 and which controls the opening and closing of the high pressure valve $V_4$. The passage 85, of course, permits communication between cylinder 86 and conduit 82 and valve $V_4$. As shown in Fig. 6, the cylinders 77 and 86 of the multiplying valves communicate with the fluid passage 105 through fluid passages 106 and 107, respectively. The purpose of the fluid passages 106 and 107 is to drain any fluid that leaks past the pistons 76 and 84 into the fluid reservoir 51. The purpose of the multiplying valves is to provide for controlling relatively high fluid pressures of the order of 2000 pounds per square inch by a very small inertia force applied to the pilot valves $V_1$ and $V_2$ by the control mass M.

As hereinbefore pointed out, a principal object of my invention is to provide a shock absorber which distinguishes the movements of the sprung mass from the movements of the unsprung mass, and which provides for resisting the vertical movements of the sprung mass by a relatively large force and for resisting the vertical movements of the unsprung mass under all operative conditions with a relatively small force, except under the conditions when the tires tend to leave the road surface. Therefore, to accomplish this provision, I provide for so mounting the control mass M that it has two degrees of freedom, one degree of freedom being the rotational movements of the control-mass M in response to the vertical movements of the sprung mass of the vehicle, and the other degree of freedom being the translational movements of the control-mass M in response to the translational movement of the piston 21 as the unsprung mass of the vehicle moves relatively to the sprung mass.

These two degrees of freedom are obtained by the combination of two actuating arms 112 and 115. The left hand end of the actuating arm 115 is integrally connected to an inverted U-shaped straddle member 116. The open ends of the inverted U-shaped member 116 are pivotally mounted upon a stationary pin 118 that is carried by the piston 21. As illustrated, the control arm 112 extends through the inverted U-shaped member 116 and is pivotally mounted upon a pin 117 which extends transversely through the sides of the inverted U-shaped member at a point substantially vertically above the stationary pivot pin 118. The right hand ends of both the control arms 112 and 115 are disposed between the ends of the oppositely disposed pilot valves $V_1$ and $V_2$. As illustrated, a relatively long flexible spring 113 is mounted under the left-hand end of the control arm 112 to balance the control-mass M against the force of gravity. An adjustable screw 114 is provided so that, in the assembly of the shock absorber, the spring tension may be so adjusted as to balance the force of gravity of the control-mass M. In the balanced position of the control-mass M, the right-hand end of the control arm 112 is balanced between the pilot valves $V_1$ and $V_2$.

In this embodiment of the invention, the total movement of the pilot valves $V_1$ and $V_2$ is very small, and accordingly, the rotational movement of the control-mass M about the pivot 117 is relatively small. For this relatively small range of movement of the control-mass, the change in the force of the supporting spring 113 is substantially negligible compared with the inertia force of the control-mass. In the actual construction of a shock absorber embodying the features of my invention, the total movement of the control arm 112 at the point where it is supported by the flexible spring 113 is approximately .025 of an inch. This allows substantially the full inertia force of the control-mass to act upon the pilot valves $V_1$ and $V_2$. Therefore, by reason of the fact that the change in the force of supporting spring 113 is substantially negligible compared with the inertia force of the control-mass, the pilot valves $V_1$ and $V_2$ are actuated by a force that is substantially proportional to the rate of change of the vertical velocity of the sprung mass of the vehicle. Furthermore, since the change in spring pressure is substantially negligible, my shock absorber is very sensitive to even small amplitudes of the sprung mass of the vehicle.

As illustrated, a depending wire spring 119 having its upper end mounted within the piston 21 and having its lower free end mounted within a suitable opening in the top of the inverted U-shaped member, is provided for giving stability to the entire operation of the system of control arms 112 and 115. In the static position of the system of control arms 112 and 115, the right-hand end of the control arm 115 is balanced between the two ends of the pilot valves $V_1$ and $V_2$.

Therefore, in the operation of the control-mass M, should the sprung mass of the vehicle be moving upwardly with an increasing vertical velocity, the rotational movement of the control-mass M, will lag the vertical movement of the sprung mass of the vehicle, and thereby cause the right-hand end of the control arm 112 to actuate the pilot poppet valve $V_1$ towards its closed position. Conversely, should the sprung mass of the vehicle be moving downwardly with an increasing vertical velocity, the rotational movement of the control-mass M will lag the movement of the sprung mass of the vehicle, and thus cause the right-hand end of the control arm 112 to actuate the pilot poppet valve $V_2$ downwardly.

For the translational movement of the piston 21, the control-mass M moves horizontally with respect to the piston 21, and in view of the fact that the control arm 112 is pivoted to the pin 117 at a point above the stationary pivot pin 118, any translational movement of the control-mass M causes the right-hand end of the control arm 115 to move up-and-down, and thereby actuate either one of the two pilot poppet valves $V_1$ and $V_2$, independently of the control arm 112. Therefore, it is noted that the pilot poppet valves $V_1$ and $V_2$ which, in turn, control the interchange of fluid between the piston chambers 65 and 66, are actuated by the control arms 112 and 115 in accordance with both the vertical movements of the sprung mass of the vehicle, and with the translational movements of the piston 21, the latter of which being primarily responsive to the relative movement of the sprung and unsprung masses of the vehicle.

Even though the translational movements of the control-mass M are responsive to the relative movements of the sprung and the unsprung mass, it is observed that the translational movements of the control-mass M respond principally to the movements of the unsprung mass rather than the sprung mass, for the reason that the rates of change of the vertical velocity of the unsprung mass are always many times greater than the rates of change of the vertical velocity of the sprung mass. Therefore, the translational movements of the control-mass M are substantially responsive to the absolute rates of change of the vertical velocity of the unsprung mass of the vehicle. Furthermore, by reason of the fact that the rotational movements of the control-mass M function to keep the magnitude of the vertical displacements of the sprung mass of the vehicle to a minimum, the translational movements of the control-mass M are still more responsive to the absolute rates of change of the vertical velocity of the sprung mass of the vehicle than the translational movements of the control-mass M would be if my shock absorber did not keep the vertical movements of the sprung mass of the vehicle to a minimum.

As illustrated, the width of the control arm 115 is less than the width of the control arm 112 by an amount substantially equal to, or slightly more than, the travel of the pilot valves $V_1$ and $V_2$. This clearance allows the actuating end of the control arm 112 to operate the pilot valves $V_1$ and $V_2$ without the ends of the pilot valves contacting, or disturbing the balanced position of, the actuating arm 115.

The general construction of the various parts of my shock absorber are relatively simple which greatly facilitates the assembly of the entire shock absorbed. In the assembling of the piston, the valve assembly block 64, except for the pilot valves $V_1$ and $V_2$, is inserted in the hollow recess portion of the right-hand end of a piston. As illustrated in Fig. 5, the valve assembly block 64 is securely and rigidly held in position by relatively long screws 53 which extend longitudinally through the valve assembly block 64 and threadedly engage the central portion of the piston 21. After the valve assembly block 64 is securely fastened within the hollow recess portion of the right-hand end of the piston 21, the poppet valves $V_1$ and $V_2$ may be inserted in their proper position through the enlarged aperture into which the right-end of the control arms 112 and 115 are allowed to move. After the valves $V_1$ and $V_2$ are positioned, the control mass M and the system of control arms 112 and 115 may be pivotally mounted upon the stationary pin 118. At this part of the assembly, the supporting spring 113 may be inserted and adjusted to balance the control-mass against the force of gravity. When the spring adjustment is made the right end of the fluid tube 68 is firmly pressed at a considerable distance within the fluid duct 69. Finally, the end piston plate 67 may be firmly pressed into the left-hand end of the piston 21. A press fit is sufficient because the fluid pressure acts to hold the piston plate 67 in place. The control-mass M is provided with a longitudinal opening so as to allow the control-mass M to move without striking the fluid tube 68. While I have briefly outlined the manner in which the various essential parts of the piston may be assembled, it is apparent that the chronological order of assembling these parts may be varied somewhat from the foregoing description.

After the piston 21 is completely assembled it is then inserted within the bore of the piston 20 through the left-hand open end of the cylinder 20. Then the cylinder head 45 is tightly screwed on by means of a suitable tool which engages the recesses 47 provided in the end of the piston head 45. Any suitable gaskets, such as the one indicated at 46, may be provided between the cylinder head 45 and the end of the cylinder bore. In view of the fact that the fluid pressures within the piston chamber 65 may attain values as high as 2000 pounds per square inch, and sometimes higher in cases of abnormal jolts, I provide means for preventing the fluid from leaking through the gasket 46 To this end, the cylinder head 45 is provided with a circular groove 48, and at a point on top of the cylinder 20 an aperture 49 (see Figs. 3 and 6) interconnects the fluid groove 48 with a longitudinal fluid passage 50 that leads to the fluid reservoir 51 provided in the central part of the cylinder 20. Therefore, should any fluid leak past the threads of the cylinder head 45, the fluid, being of a low pressure, will flow through the aperture 49 and the fluid passage 50 back into the fluid reservoir 51 instead of leaking through the gasket 56. The fluid reservoir 51 not only comprises the enlarged central portion of the cylinder 20 but also the various recesses within the piston 21.

After the piston 21 is mounted within the cylinder bore 20, the rock shaft 23 and the driving collar 25 may be inserted through the open side of the cylinder 20. Finally, the side plate 39 may be mounted in place by the screws 40 or other suitable means. This completes the entire assembling of the shock absorber and the fluid may be poured into the shock absorber through a suitable opening which receives a pipe-plug 52. As the fluid is poured into the reservoir 51 of the shock absorber, part of the fluid flows through a ball-check valve 110 provided in the left-hand piston plate 67 and thence into the piston chamber 66 (see Figs. 3 and 6); likewise, another part of the fluid flows through a fluid passage 105 and a ball-check valve 108 that is provided in the valve assembly block 64 and thence into the piston chamber 65, and the remaining part of the fluid fills the fluid reservoir 51 which includes the enlarged central portion of the cylinder and the recesses of the piston 21. Therefore, an extra large supply of fluid is always available to keep the piston chambers 65 and 66 full at all times.

Figure 10:
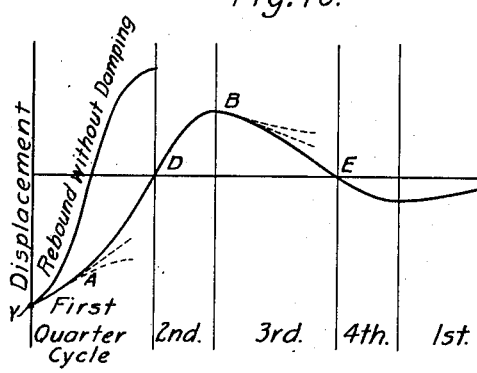
Fig. 10 is a performance curve that illustrates the manner in which the vertical movements of the sprung mass of a vehicle are resisted by a shock absorber constructed in accordance with my invention.

In explaining the operation of the shock absorber with respect to the movements of the sprung mass of the vehicle, reference may be had to the curve shown in Fig. 10. Let it be assumed that the springs of the vehicle are compressed as they will be after the vehicle passes over an irregularity in the road surface. The position of the sprung mass when the springs of the vehicle are compressed may be represented by the point Y of Fig. 10. Under this assumed condition, since the springs of the vehicle are compressed, they exert an upward force upon the sprung mass of the vehicle. Therefore, the sprung mass of the vehicle moves upwardly first with an increasing vertical velocity and then with a decreasing vertical velocity as the spring of the vehicle approaches the upper end of expansion. After the sprung mass has reached its upper position, it then moves downwardly first with an increasing vertical velocity and then with a decreasing vertical velocity as the springs of the vehicle approach the ends of their second compression.

The points where the increasing vertical velocity of the sprung mass changes to a decreasing vertical velocity will be designated hereinafter as the balanced position of the sprung mass, see points D, E and F of Fig. 10. Therefore, when the sprung mass of the vehicle is in its balanced position, the control-mass M is likewise in its balanced position, which means that the pilot valve $V_1$ is actuated by means of gravity to its open position and the pilot valve $V_2$, while actuated by gravity to its closed position, is easily biased upwardly to its full open position by the fluid pressure acting against the bottom of the valve. Therefore, in the balanced position of the sprung mass, the shock absorber functions to offer substantially no resistance to the relative movements of the sprung and the unsprung masses of the vehicle.

That part of the cycle, see Fig. 10, in which the sprung mass is moving upwardly with an increasing vertical velocity will hereinafter be designated as the first quarter-cycle; that part in which the sprung mass is moving upwardly with a decreasing vertical velocity will be designated as the second quarter-cycle; that part in which the sprung mass is moving downwardly with an increasing vertical velocity will be designated as the third quarter-cycle; and that part in the spring mass which is moving downwardly with a decreasing vertical velocity will be designated as the fourth quarter-cycle.

Assume now that the springs of the vehicle have been compressed and are forcing the sprung mass of the vehicle upwardly in the first quarter-cycle. During this period, by reason of the fact that the sprung mass is moving upwardly with an increasing vertical velocity, the rotational movement of the control-mass M lags behind the movement of the sprung mass, and thereby causes the control arm 112 to actuate the poppet valve $V_1$ towards its closed position. At the same time, it will be observed that the clockwise motion of the axle arm 22 actuates the piston 21 to the left and thus subjects the fluid in the chamber 66 to a pressure, as determined by the position of the pilot valve $V_1$ with respect to its seat. Therefore, as the piston moves to the left, the fluid of the piston chamber 66 of high pressure flows through the fluid pipe 68, the fluid duct 69, and thence into the fluid junction 70. At this fluid junction, the fluid branches and tries to flow through three fluid passages, 71, 80 and 101. However, in this embodiment of the invention, the fluid that branches into the fluid passages 80 and 101 cannot flow therethrough because the associated spring-biased ball-check valves 81 and 102 resist the said flow. Therefore, the only means of escape for the fluid is through the fluid passage 71 and the upper multiplying valve. During the first instant, the fluid pressure in the fluid passage 71 rises to such a value as to lift the high pressure valve $V_3$ from its seat, see Figs. 6 and 7, the latter figure being an enlarged view of the upper multiplying valve. The rising of the high pressure valve $V_3$ allows the fluid to flow through the opening of the high pressure valve $V_3$ and thence into the enlarged portion of the duct 72 that surrounds the lower part of the stem of the high pressure valve $V_3$. From the enlarged portion of the fluid passage 72, a very small fractional part of the fluid flows through the restriction 78 provided in the stem of the high pressure valve $V_3$ and thence into the fluid chamber 77 above the piston 76, and the remaining large fractional part of the fluid, after the fluid pressure thereof builds up sufficiently to bias the ball-check valve 74 to the right, flows into the piston chamber 65 of low pressure. In this embodiment of the multiplying valve, the biasing force of the spring against the ball-check valve 74 is relatively low, which means that the pressure of the fluid within the fluid passage 72 is kept to a relatively low value.

By reason of the fact that the pilot valve $V_1$ is closed, during the first quarter-cycle, the fluid that flows through the restriction 78 immediately fills the fluid chamber 77 above the piston 76. Consequently, the pressure of the fluid in the chamber 77 above the piston 76 immediately rises to a value equal to the pressure of the fluid in the fluid passage 72. Therefore, by reason of the relatively large area of the piston 76, the high pressure valve $V_3$ is hydrostatically biased downwardly towards its closed position, with the result that the movement of the fluid through the high pressure valve $V_3$ is greatly restricted.

As a result of the restricted flow of the fluid through the valve $V_3$, the pressure of the fluid in the fluid passage 72 is, accordingly, reduced to such a value that the pressure of the fluid acting upon the ball-check valve 74 is less than the opposing force of the biasing spring. This means that the fluid is unable to flow into the piston chamber 65 of low pressure. However, just as soon as the pressure of the fluid in the fluid passage 72 is slightly lowered, the pressure of the fluid in the chamber 77 acting downwardly upon the piston 76 is likewise lower, with the result that the high pressure valve $V_3$ is hydrostatically biased upwardly a very slight distance. This means that the movement of the fluid through the high pressure valve $V_3$ is less restricted and, accordingly, the pressure of the fluid in the fluid passage 72 again builds up to such value as to overcome the opposing biasing force of the spring against the ball-check valve 74. The re-opening of the ball-check valve 74 allows the fluid within the fluid passage 72 to escape to the piston chamber 65 of low pressure. The result of this action is such that the pressure of the fluid in the duct 72 is always maintained substantially at a constant value, as determined by the opposing biasing force of the spring acting against the ball-check valve 74.

The action of the multiplying valve is such as to control the fluid of a relatively high pressure by a very small amount of force exerted upon the pilot valve $V_1$, and, at the same time, is such as to provide a high degree of proportionality between the force exerted by the fluid of high pressure upon the high pressure valve $V_3$ and the force exerted by the control-mass M against the pilot valves $V_1$ and $V_2$.

The action of my multiplying valve may be best understood by designating the various parts of the multiplying valve and the corresponding fluid pressures in the various parts by symbols and assigning arbitrary values to the said symbols.

Let:
(1) $P_{71}$=The pressure of the fluid in the fluid passage 71.
(2) $P_{72}$=The pressure of the fluid in the fluid passage 72.
(3) $P_{76}$=The pressure of the fluid acting downwardly on the piston 76.
(4) $A_{71}$=The area of the lower end of the high pressure valve $V_3$.
(5) $A_{72}$=The area of the stepped-stem of the high pressure valve $V_3$ that is affected by the fluid pressure in the fluid passage 72.
(6) $A_{76}$=The area of the piston 76.
(7) $R_3$=The resistance encountered by the fluid flowing through the high pressure valve $V_3$.
(8) $R_{78}$=The resistance encountered by the fluid flowing through the restriction 78.
(9) $R_1$=The resistance encountered by the fluid flowing through the poppet valve $V_1$.
(10) F=The rate of flow of the fluid, assuming viscous flow.

Therefore, the hydrostatic force acting on the high pressure valve $V_3$ may be expressed by the equation:

$$P_{71}A_{71}=P_{76}A_{76}-P_{72}A_{72} \quad\quad\quad (1)$$

Also:
$$P_{76}=FR_1 \quad\quad\quad (2)$$

and
$$P_{72}=F\times(R_1+R_{78}) \quad\quad\quad (3)$$

Substituting (2) in (3), and (3) thus becomes:

$$P_{72}=P_{76}\times\frac{(R_1+R_{78})}{R_1} \quad\quad\quad (4)$$

As for arbitrary values for the foregoing symbols, assume that:

(1) $P_{71}$ (maximum) = 1700 lbs. per square inch.
(2) $P_{71}$ (free flow or minimum) = 80 lbs. per square inch, and
(3) $P_{72}$ = 50 lbs. per square inch.
(4) $A_{71}$ = .02 square inch.
(5) $A_{72}$ = .04 square inch, and
(6) $A_{76}$ = .72 square inch.

Therefore, the value of $P_{76}$ when $P_{71}$ is a maximum, may be determined by substituting the foregoing arbitrary values in Equation 1.
Thus:

$$1700\times.02=.72P_{76}-50\times.04$$

or
$$P_{76}=50 \text{ lbs. per sq. inch} \quad\quad\quad (5)$$

Similarly, the value of $P_{76}$ may be determined, when $P_{71}$ is a minimum, by solving the following equation:

$$80\times.02=.72P_{76}-50\times.04$$

or
$$P_{76}=5 \text{ lbs. per sq. inch} \quad\quad\quad (6)$$

Therefore, by assuming that, $$P_{71} \text{ (maximum)} = 1700 \text{ lbs.}$$

and that $$P_{71} \text{ (free flow or minimum)} = 80 \text{ lbs.}$$

the corresponding pressure range of the fluid in the chamber 77, which acts against the pilot valve $V_1$, is from 50 to 5 lbs. per square inch. Inasmuch as the area of the valve seat for the pilot valve $V_1$ is a very small fractional part of a square inch, the force of the fluid pressure acting downwardly upon the poppet valve $V_1$ is of a very small order, measurable as a very small fractional part of a pound of force. This means that the inertia force of the control-mass M need likewise be very small, for the reason that it need be only sufficient to overcome the downward biasing force of the fluid pressure acting on the upper end of the pilot valve $V_1$.

Therefore, it is noted that the position of the pilot valve $V_1$, with respect to its valve seat, is determined both by the hydrostatic force exerted by the fluid pressure acting downwardly upon the upper end of the valve and by the inertia force of the control-mass M acting upwardly upon the bottom of the valve. Since $P_{72}$ is arbitrarily chosen as 50 lbs. per square inch, this being the value as determined by the opposing biasing force of the spring acting upon the ball-check valve 74, it is noted from Equation 1 that the pressure $P_{71}$ is determined by the value $P_{76}$, but from Equation 4 it is noted that the value of $P_{76}$, since $P_{72}$ is 50 lbs. per square inch, is determined solely by the ratio $$\frac{R_1}{R_{78}}$$

This means that, since the value of $R_{78}$ is constant, the value of $P_{76}$ and according to the position of the high pressure valve $V_3$, is determined solely by the position of the pilot valve $V_1$ with respect to its seat. Therefore, when $P_{76}=50$ lbs. per square inch, being its maximum value, it is noted that by substituting 50 for $P_{76}$ in Equation 4, the expression:

$$\frac{(R_1+R_{78})}{R_1}=\text{infinity}$$

thus indicating that the pilot valve $V_1$ and, accordingly, the high pressure valve $V_3$ is making a perfect seal against its seat. However, when $$P_{76}=5 \text{ lbs. per square inch}$$

being its free flow or minimum value, it is noted that by substituting 5 for $P_{76}$ in Equation 4 the expression:

$$\frac{(R_1+R_{78})}{R_1}=1/10$$

Hence, $$R_1=9R_{78}$$

Therefore, when the pilot valve $V_1$ is in its full open position, the resistance to the flow of fluid through the restriction 78 is nine times as great as the resistance to the flow of fluid through the pilot valve $V_1$.

Figure 7:
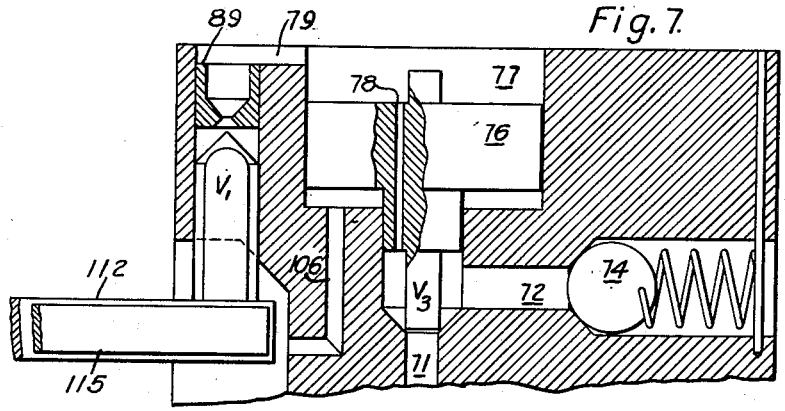
Fig. 7 is a side elevational cross sectional view of the preferred form of the multiplying valves of my shock absorber.
Figure 9:
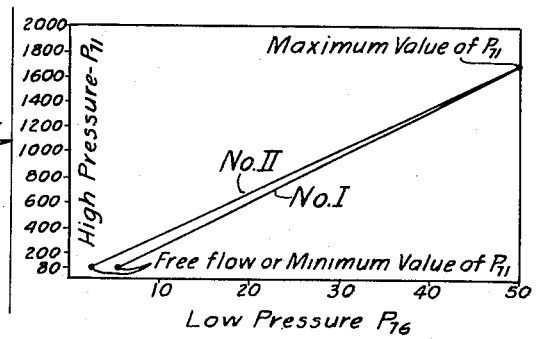
Fig. 9 is a view illustrating the operating characteristics of the preferred and the modified forms of my multiplying valves.

Therefore, summarizing the operation of the multiplying valve, it is noted that when the pilot valve $V_1$ is in its full open position, the pressure above the piston 76 is low and the high pressure valve $V_3$ is in its full open position, that when the pilot valve $V_1$ is in its closed position, the high pressure valve $V_3$ is in its closed position, and that for any intermediate position of the pilot valve $V_1$, the high pressure valve $V_3$ assumes a correspondingly intermediate position. The operating characteristics of the multiplying valve, a large view being shown in Fig. 7, is represented by the straight line No. I, shown in Fig. 9. By reason of the stepped-stem of the high pressure valve $V_3$, being the area represented by $A_{72}$, the positions assumed by the high pressure valve $V_3$ do not exactly correspond to the positions of the pilot valve $V_1$ throughout the entire range of multiplication for the reason that if the straight line No. I were extended it would not pass through the origin, but for all practical purposes, the corresponding positions may be considered substantially the same.

However, in the embodiment of the multiplying valve, since the pressure of the fluid in the fluid passage 72 is limited to a relatively low value, as determined by the spring acting against the ball-check valve 74, my multiplying valve never ceases to multiply. This means that the force of the fluid acting downwardly on the valve 76, under all conditions, is always equal to the force acting upwardly on the valve 76, and in this respect the high pressure valve $V_3$ may be considered as a hydrostatically balanced valve.

Figure 8:
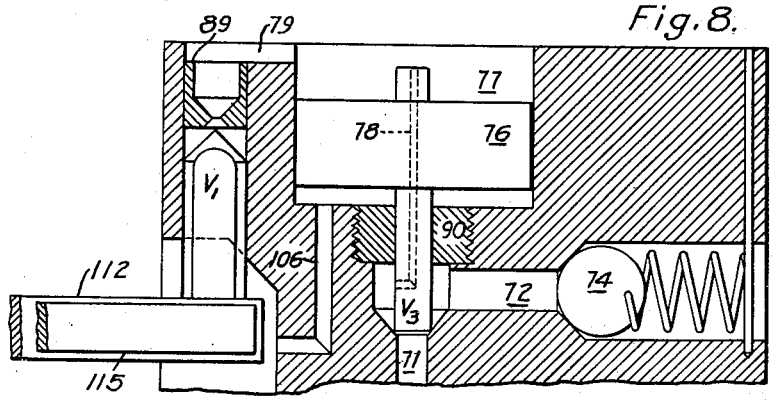
Fig. 8 is a side elevational cross sectional view of a modified form of the multiplying valves of my shock absorber.

In Fig. 8, I show a modified form of my multiplying valve in that the valve stem of the high pressure valve $V_3$ is not stepped, and that the restriction 78 passes through the center of the straight valve stem. Therefore, in the modified form of my multiplying valve, since the pressure of the fluid passage 72 does not have any area upon which to hydrostatically raise the valve 76, the multiplication ratio is determined solely by the ratio of the area of the high pressure valve $V_3$ with respect to the area of the piston 76. The characteristic of the modified form of my multiplying valve is shown by the straight line No. II of Fig. 9. While the modified form of my multiplying valve provides a constant multiplication ratio, I prefer the multiplying valve shown in Fig. 7. In the modified form of my multiplying valve, the manufacturing costs are slightly greater, because it is necessary to provide a threaded plug 90 in order to be able to drill out the enlarged portion surrounding the lower part of the valve stem of the high pressure valve $V_3$. Also in the modified form of my multiplying valve, since the pressure of the fluid in the fluid passage 72 does not help to lift the high pressure valve $V_3$, the size of the restriction 78 is somewhat less than it is in the preferred form, thus making it more difficult to manufacture.

In both the preferred and in the modified form of my multiplying valve, the multiplying valve never ceases to multiply and that the position of the high pressure valve $V_3$ with respect to its seat is substantially proportional to the position of the pilot valve $V_1$ with respect to its seat. Inasmuch as the area of the opening of the pilot valve $V_1$ is proportional to the rate of change of the vertical velocities of the sprung mass, the resistance offered to the flow of fluid by the high pressure valve $V_3$ is likewise proportional to the rate of change of the vertical velocities of the sprung mass of the vehicle. For a poppet valve, such as either valve $V_1$ or $V_2$, tests disclose that the area of the opening of the poppet valve, when actuated by a control-mass, varies substantially in accordance with the rate of change of vertical velocities of the sprung mass. This is true not only because the poppet valve presents an area against which the fluid pressure can act, but also because it provides a gradual opening as it moves relatively to its seat.

I have found that the best riding qualities of a vehicle are attained when a shock absorber provides for resisting the relative movements of the sprung and unsprung masses in accordance with the rate of change of the vertical velocities of the sprung mass. The truth of this statement is substantiated by the fact that a resisting force responsive to the rate of change of the vertical velocities of the sprung mass provides for materially lengthening the period of the free oscillations of the sprung mass, as though an additional mass were added to the sprung mass for that part of the cycle during which the shock absorber is effective. This not only insures a smooth and easy movement of the sprung mass but also provides for reducing the resonance frequency of the movements of the sprung mass, whereby it is less likely to be influenced by the undulations of the road surface than it would be if the shock absorber did not function to alter the wave form of the movements.

Again referring to Fig. 10 which shows the movements of the sprung mass, it is observed that, at the beginning of the first quarter-cycle, the shock absorber resists movements of the sprung mass with a relatively large force, which force gradually decreases in accordance with the rate of change of the increasing vertical velocity of the sprung mass to a small value, being the free flow of minimum value, as the sprung mass of the vehicle approaches the balance position. Consequently, the greater the force tending to increase the vertical velocity of the sprung mass of the vehicle, the greater the resisting force of the shock absorber.

During the second quarter-cycle, the movement of the piston 21 is still to the right, but the sprung mass of the vehicle is moving upwardly with a decreasing vertical velocity, which causes the rotational movements of the control-mass M to lead the movement of the sprung mass of the vehicle. This leading movement of the control-mass causes the control arm 112 to move downwardly and thus allow the pilot valve $V_1$ to open. The downward movement of the control arm 112 also closes the pilot valve $V_2$. But the closing of the valve $V_2$, during the second quarter-cycle, does not produce any action of the shock absorber, because the lower multiplying valve is inactive during the second quarter-cycle. The opening of the pilot valve $V_1$ to its full open position allows the high pressure valve $V_3$ to likewise assume its full open position. Therefore, during the second quarter-cycle a free flow condition is established from the interchange of the fluid from the piston chamber 66 to the piston chamber 65. When the springs of the vehicle have reached the end of their expansion at the end of the second quarter-cycle, the sprung mass then moves downwardly in the third quarter-cycle.

During the third quarter-cycle, since the sprung mass is moving downwardly with an increasing vertical velocity, the rotational movements of the control-mass M lags behind the movements of the sprung mass of the vehicle, and thereby causes the control arm 112 to exert a downward force to close the pilot valve $V_2$. At the same time, it will be observed that the piston 21 moves to the right to subject the fluid in the piston chamber 65 to a pressure that is determined by the position of the pilot valve $V_2$ with reference to its seat.

As hereinbefore explained in connection with the operation of the pilot valve $V_1$, the pilot valve $V_2$ likewise assumes such position relative to its seat that the fluid in the piston chamber 65 is subject to a pressure that is proportional to the rate of change of the downward increasing vertical velocity of the sprung mass. During the third quarter-cycle, since the spring biased ball check valve 74 prevents the fluid flowing through the upper multiplying valve, the fluid in the chamber 65 of high pressure flows through a fluid passage 83, past the high pressure valve $V_4$ and thence into the fluid passage 82, at which point a very small fractional part of the fluid flows through the restriction 85 and thence into the piston chamber 86, and the remaining large fractional part of the fluid flows from the fluid passage 82, past the ball check valve 81, through the fluid passage 80, the fluid junction 79, and thence through the fluid duct 69 and the fluid pipe 68 to the piston chamber 66 of low pressure. The sides of the pilot valves $V_1$ and $V_2$ are cut away, so that the fluid, which flows past the said valves, flows along the cut-away sides of the valves and thence into the fluid reservoir 51. The structure and the operation of the lower multiplying valve is identical to that of the upper multiplying valve. Therefore, the relative movement of the sprung and the unsprung masses of the vehicle, during the third quarter-cycle, are resisted by a force that is large at the beginning of the third quarter-cycle, and which gradually decreases in accordance with the rate of change of the increasing vertical velocity of the sprung mass to a small force, being the free-flow or minimum value, as the sprung mass approaches its balanced position, indicated by the point E of Fig. 4.

During the fourth quarter-cycle, the sprung mass of the vehicle is still moving downwardly, but with a decreasing vertical velocity.

Consequently, the rotational movement of the control-mass M leads the downward movement of the sprung mass of the vehicle, and thereby causes the control arm 112 to move upwardly. The upward movement of the control arm 112 thereby allows the fluid pressure acting on the bottom of the pilot valve V₂ to hydro-statically bias the pilot valve V₂ to its full open position. At the same time, however, the control arm 112 exerts an upward force to close the pilot valve V₁, but, in doing so, the performance of the shock absorber is unchanged since the upper multiplying valve is already inoperative, for the reason that during the downward movement of the spring mass, the spring bias ball check valve 74 prevents any fluid from flowing to the high pressure valve V₃. Therefore, during the fourth quarter-cycle, the sprung and the unsprung masses of the vehicle are resisted by a relatively small force that is determined by the free-flow condition of the lower multiplying valve and the associated fluid passages.

Summarizing the performance of the shock absorber caused by the rotational movement of the control-mass M, it is noted that my shock absorber resists the relative movement of the sprung and unsprung masses of the vehicle during the first and third quarter-cycles by a force that is substantially proportional to the rate of change of the vertical velocity of the sprung mass, and that during the second and fourth quarter-cycles, the shock absorber provides for resisting the relative movements of the sprung and unsprung masses of the vehicle by a relatively small force, as determined by the free-flow condition of the multiplying valves and the associated fluid passages.

In order to have efficient operation of a shock absorber for a vehicle, it is necessary that the spring that supports the vehicle shall always be substantially free to expand when the wheels encounter a depression in a road surface. In this connection, let it be assumed that the shock absorber is functioning to retard the upward movement of the sprung mass of the vehicle during the first quarter-cycle, and that, during this time, the wheels encounter a depression in a road surface, see point A of Fig. 10.

Under this assumed condition, at the instant before the wheels encounter the depression, my shock absorber is functioning to resist the relative movements of the sprung and unsprung masses of the vehicle, for the reason that the sprung mass is moving upwardly with an increasing vertical velocity, which thereby causes the rotational movements of the control-mass M to close the pilot valve V₁. However, just as soon as the wheels of the vehicle begin to fall into the depression of the road surface, the upward increasing vertical velocity of the sprung mass changes either to an upward constant vertical velocity or to an upward decreasing vertical velocity, see point A of Fig. 10. In either of these cases the rotational movement of the control-mass M opens the pilot valve V₁, and thus permits the springs of the vehicle to be substantially free to expand, thereby allowing the springs of the vehicle to push the wheels downwardly into the depression of the road surface.

Likewise, in order to have efficient operation of a shock absorber for a vehicle, it is necessary that the springs that support the sprung mass of the vehicle shall always be substantially free to compress when the wheels of the vehicle encounter a raised portion of the road surface. Consider the case in which the shock absorber is functioning to retard a downward movement of the sprung mass of the vehicle during the third quarter-cycle, and that, during this time, the wheels encounter a raised portion of a road surface, see point B, Fig. 10.

Under this assumed condition, at the instant before the wheels encounter the raised portion, my shock absorber is functioning to resist the relative movements of the sprung and unsprung masses of the vehicle, for the reason that the sprung mass is moving downwardly with an increasing vertical velocity, which thereby causes the rotational movements of the control mass M to close the pilot valve V₂. However, just as soon as the wheels of the vehicle encounter the raised portion of the road surface, the downward increasing vertical velocity of the sprung mass changes either to a downward constant vertical velocity or to a downward decreasing vertical velocity, see point B of Fig. 10. In either of these cases, the rotational movement of the control-mass M allows the fluid pressure acting upwardly on the pilot valve V₂ to raise the valve V₂ to its full open position.

The opening of the pilot valve V₂ allows the springs to compress, so that the wheels may pass over the raised portion of the road surface without causing the shock absorber to transmit any jolts to the unsprung mass of the vehicle. From the foregoing description it is observed that the position of the valves and the control-mass M, during conditions represented by the point A of Fig. 10, are the same as the position of the valves and the control-mass M during the second quarter-cycle, and the position of the valves and the control-mass M, during conditions represented by the point B of Fig. 10 are the same as the position of the valves and the control-mass M during the fourth quarter-cycle. This is the reason why I provide for allowing substantially free relative movement of the sprung and the unsprung masses of the vehicle during the second and fourth quarter-cycles.

With reference to the performances of my shock absorber, as illustrated in Fig. 10, it is evident that my shock absorber provides for materially lengthening the period of the free oscillations of the sprung mass as though an additional mass were added to the sprung mass during the first and third quarter-cycles. By reason of the fact that the duration of the first and third quarter-cycle periods of the sprung mass of the vehicle are much longer than what they normally would be without any shock absorber, the resonance frequency of the vertical movements of the sprung mass is accordingly much less. This means that the periodicity of the sprung mass is less likely to correspond to the undulations of the road surface, and thus prevents any increase in the amplitude of the vertical movement of the sprung mass caused by sympathetic vibrations.

The operations of my shock absorber which are controlled by the translatory movements of the piston 21 will now be described. As hereinbefore stated, the translatory movements of the piston 21 are principally caused by the movements of the unsprung mass rather than the sprung mass of the vehicle, for the reason that the rates of change of the vertical velocity of the unsprung mass are always many times greater than the rates of the change of the vertical velocity of the sprung mass. For the purpose of clarity in describing the operations of my shock absorber that are caused by the vertical movements of the unsprung mass, I will arbitrarily assume that the weight of the sprung mass of the vehicle is four times the weight of the unsprung mass, and that the normal displacement of the tires when the vehicle is vertically stationary is one inch.

Consider the case in which the movement of the unsprung mass is vertically upward, as it will be when the wheels of the vehicle encounter an abrupt raised portion in the road surface. Under this assumed case, just as soon as the tires strike the raised portion, the tires will be compressed beyond their normal one inch of displacement, and, at the same time, the unsprung mass of the vehicle will move upwardly with an increasing vertical velocity. As the unsprung mass moves upwardly, the tires will begin to expand to their normal one inch displacement, and at the point the tires expand to their one inch displacement, the upwardly increasing vertical velocity changes to an upward decreasing vertical velocity. During the period when the wheels are moving upwardly with a decreasing vertical velocity, the displacement of the tires gradually becomes less until the tires reach their full expanded condition at the point when the tires tend to leave the road surface.

When the unsprung mass is moving upwardly, the movement of the piston 21 relative to its cylinder 20 is to the right. This means that the fluid in the piston chamber 65, since the spring biased ball check valve 74 prevents the fluid from flowing through the upper multiplying valve, must flow through the lower multiplying valve. During the period when the unsprung mass is moving upwardly with an increasing vertical velocity, the translational movement of the control-mass M lags the translational movement of the piston 21, and thereby causes the right-hand end of the control arm 115 to move upwardly. This allows the fluid acting upwardly on the bottom end of the pilot valve V₂ to be hydrostatically biased to its full open position, thus establishing the free-flow condition of the lower multiplying valve. Therefore, the fluid in the piston chamber 65 of high pressure may flow through the lower multiplying valve and the associated ducts to the piston chamber 66 of low pressure. During this time, although the upper movement of the control arm 115 closes the pilot valve V₁, the free-flow condition of the shock absorber is unchanged, since the upper multiplying valve is already inactive.

Therefore, during the period that the unsprung mass is moving upwardly with an increasing vertical velocity, the shock absorber allows the spring that supports the sprung mass to absorb the shock caused by the wheels encountering a raised portion in the road surface.

However, at the point that the wheels begin to move upwardly with a decreasing vertical velocity, the translational movement of the control-mass M begins to lead the translational movement of the piston 21, and thereby causes the right-hand end of the control arm 115 to exert a downward force to close the pilot valve V₂. The closure of the pilot valve V₂ causes the lower multiplying valve to resist the interchange of the fluid from the piston chamber 65 of high pressure to the piston chamber 66 of low pressure. This action, in turn, causes the relative movement of the sprung and unsprung masses to be resisted by a force that is determined by the translational movement of the control-mass M. In other words, at the point that the upward increasing vertical velocity of the unsprung mass changes to an upward decreasing vertical velocity, this point being, in accordance with the foregoing assumption, where the expansion of the tires is one inch, my shock absorber provides for dissipating the kinetic energy of the unsprung mass, with the result that the tires are prevented from leaving the road surface. It is observed that the action of the control-mass M for the translational movements is cumulative. Thus, the more that the interchange of the fluid from the piston chamber 65 of high pressure to the piston chamber 66 of low pressure is restricted, the more the translational movements of the control mass tends to close the pilot valve V₂.

Therefore, the depending wire spring 119, in addition to stabilizing the control arms 112 and 115, prevents the cumulative action of the control-mass M from being too large. In this embodiment of the invention, the strength of the depending wire spring 119 is such that the pilot valve V₂, when the wheels are passing over a raised portion, is not fully closed until the negative acceleration of the unsprung mass is substantially five times the acceleration of gravity. Therefore, in accordance with the foregoing assumption that the weight of the sprung mass if four times the weight of the unsprung mass, the negative acceleration of the unsprung mass is approximately five times the acceleration of gravity at the point where the tires tend to leave the road surface. Consequently, by so proportioning the strength of the depending wire spring 119 the shock absorber transmits substantially no jolts to the sprung mass by keeping the tires from leaving the road surface.

However, in the case when the wheels encounter a raised portion in the road surface, there is no limit to the value of the vertical acceleration of the unsprung mass. Consequently, should the vehicle be moving at a very high rate of speed, the value of the acceleration of the vertical movements of the unsprung mass may become many times the acceleration of gravity. This rapid acceleration causes the interchange of the fluid from the piston chamber 65 of high pressure to the piston chamber 66 of low pressure through the lower multiplying valve and associated ducts to become so great that even though the high pressure valve V₄ is in its full open position, the fluid within the piston chamber 65 may build up to pressures of the order of 5000 lbs. per square inch, or in some cases even higher. For the purpose of preventing the fluid in the piston chamber 65 from building up to such high pressure, I provide a pressure relief ball-check valve 102 strongly biased against its seat by an associated spring.

Therefore, when the pressure of the fluid in the piston chamber 65 builds up to and beyond a predetermined value, as determined by the force of the spring acting against the ball check valve 102, the fluid may rapidly escape through the pressure relief valve 102, the fluid passage 101, the fluid junction 70, and thence through the fluid duct 69 and fluid pipe 68 to the piston chamber 66 of low pressure. Under the arbitrary assumption that the maximum resisting force, caused by the lower multiplying valve of the interchange of fluid from the piston 65 of high pressure to the piston chamber 66 of low pressure, is 1700 lbs. per square inch, then the spring force of the pressure relief valve 102 is such that the said spring force is not overcome by the fluid in the piston chamber 65 until the pressure is approximately 2000 lbs. per square inch.

The operations of my shock absorber with respect to the movements of the unsprung mass when the wheels of the vehicle encounter a depression in the road surface, will now be described. Under this condition, the vertical movement of the wheels is downward and the translational movement of the piston 21 is to the left. This means that the interchange of fluid from the piston chamber 66 of high pressure to the piston chamber 65 of low pressure is through the upper multiplying valve. Just as soon as the wheels encounter the depression, the tires begin to expand and the springs of the vehicle push the unsprung mass downwardly with an increasing vertical velocity until the tires are again compressed to one inch, this being the normal displacement of the tires under the foregoing assumed arbitrary condition. At this point, since energy is consumed in further compressing the tires beyond one inch displacement, the downward increasing vertical velocity of the unsprung mass changes to a downward decreasing vertical velocity. During the period that the wheels are falling into the depression with a downward increasing vertical velocity, the translational movements of the control-mass M lags the translational movements of the piston 21 and thus causes the right-hand end of the control arm 115 to move downwardly. This allows the pilot valve $V_1$ to assume its full open position, which, in turn, thus allow the interchange of the fluid from the piston chamber 66 of high pressure to the piston chamber 65 of low pressure through the upper multiplying valve and the associated fluid passages.

Therefore, when the springs that support the sprung mass are pushing the wheels into the depression with a downward increasing vertical velocity, the shock absorber allows substantially free relative movement of the sprung and the unsprung masses of the vehicle. This allows the wheels to fall into the depression without being resisted by the action of my shock absorber. However, at the point that the tires are being compressed beyond their normal one inch displacement, the downward increasing vertical velocity of the sprung mass changes to a downward decreasing vertical velocity, and, accordingly, the translational movements of the control-mass M lead the translational movements of the piston 21, thus causing the control arm 115 to exert an upward force to close the pilot valve $V_1$. The closure of the pilot valve $V_1$ causes the upper multiplying valve to resist the interchange of the fluid from the piston chamber 66 of high pressure to the piston chamber 65 of low pressure, with the result that the shock absorber prevents the springs that support the sprung mass from compressing the tires very much beyond their normal one inch displacement.

In other words, my shock absorber, in effect, establishes a resistance between the unsprung mass and the sprung mass so that the springs that support the sprung mass cannot easily move the unsprung mass downwardly after the tires have been compressed to their normal one inch displacement. As hereinbefore explained, the more that the upper multiplying valve tends to resist the interchange of the fluid from the chamber 66 of high pressure to the chamber 65 of low pressure, the more the control-mass M tends to close the pilot valve $V_1$. This causes the translational force of the control-mass M to be cumulative, but the stiffness of the depending wire spring 119 limits this action so as to provide the proper performance of my shock absorber.

As hereinbefore mentioned, the stiffness of the depending wire spring 119 is such that the poppet valve $V_1$ is not closed to its full position until the negative acceleration of the downwardly moving unsprung mass is approximately five times the acceleration of gravity. Other factors remaining unchanged, such as the variations in the springs that support the vehicle and assuming that the tire displacement is a straight line, the negative acceleration of the unsprung mass is approximately five times the acceleration of gravity when the tires are compressed two inches. Therefore, the translational movement of the control-mass M develops enough force to fully close the pilot valve $V_1$ until the tires are compressed two inches.

Therefore, my shock absorber absorbs the greater part of the kinetic energy of the downwardly moving unsprung mass, and, consequently, the tires will not be compressed as much as they would have been compressed had the kinetic energy not been absorbed by the shock absorber. Therefore, it follows that the potential energy of the slightly compressed tires will not be sufficient to cause the tires to rebound and leave the road surface.

Thus, generally stated, the translational movements of the control mass M causes the shock absorber to function to keep the tires of the vehicle from leaving the road surface, thereby ensuring improved traction between the tires and the irregularities of the road surface.

By reason of the fact that my shock absorber provides a resisting force that is substantially proportional to the rate of change of the vertical velocities of the spring of the vehicle and that the control-mass is sensitive even to very small amplitudes, I find that my shock absorber is particularly applicable to locomotives and other railroad rolling stock, such as Pullman cars and the like. Furthermore, my shock absorber, since it allows substantially free movement of the wheels or unsprung mass of the vehicle, does not in any manner interfere with the operation of the spring equalization system upon which the sprung mass of the locomotive is supported.

Therefore, I have disclosed a shock absorber which, when mounted on an automobile, provides for distinguishing the movements of the sprung mass from the movements of the unsprung mass and which provides for resisting the relative movement of the sprung mass by a relatively large force, and for resisting the vertical movements of the unsprung mass under all operative conditions with a relatively small force, except under the conditions when the tires tend to leave the road surface.

Since certain changes in my invention may be made without departing from the spirit and scope thereof, it is intended that all matters contained in the foregoing description and shown in the accompanying drawings shall be interpreted as illustrative and not in a limiting sense.

I claim as my invention:

1. A shock absorber for absorbing energy by providing a resisting force comprising, in combination, two relatively movable elements which co-act to provide a resisting force, control means associated with the relatively movable elements for controlling the magnitude of the resisting force, and a control-mass having two degrees of freedom for governing the control means.

2. In a hydraulic shock absorber, in combinaa fluid, means for admitting the fluid into the chamber, means for controlling the expulsion of the fluid from the chamber, and a control-mass having two degrees of freedom for governing the tion, a chamber of variable volume for containing control means.

3. In a hydraulic shock absorber, in combination, a chamber of variable volume for containing a fluid, means for admitting the fluid into the chamber, a valve for controlling the expulsion of the fluid from the chamber, and a control-mass having two degrees of freedom for governing the valve, said valve being also governed in accordance with the pressure of the fluid in the chamber.

4. In a hydraulic shock absorber, in combination, a chamber of variable volume for containing a fluid, means for admitting the fluid into the chamber, a poppet valve for controlling the expulsion of the fluid from the chamber, and a control-mass having two degrees of freedom for governing the poppet valve.

5. In a hydraulic shock absorber, in combination, a chamber of variable volume for containing a fluid, means for admitting the fluid into the chamber, a multiplying valve for controlling the expulsion of the fluid from the chamber, and a control-mass having two degrees of freedom for governing the multiplying valve.

6. In a hydraulic shock absorber, in combination, a chamber of variable capacity for containing a fluid, means for admitting the fluid into the chamber, a valve for controlling the expulsion of the fluid from the chamber, two control arms for actuating the valve, and a control-mass for actuating the two control arms.

7. The combination with a controllable member adapted to move in more than one direction, of a control arm pivotally mounted upon the controllable member, a second control arm pivotally mounted upon the first-mentioned control arm, means controlled by the two arms for governing the movements of the controllable member, and a control-mass connected to the second-mentioned control arm.

8. A shock absorber for absorbing energy by providing a resisting force comprising, in combination, two relatively movable elements which co-act to provide a resisting force, control means associated with the relatively movable elements for controlling the magnitude of the resisting force, a control arm pivotally mounted upon one of the relatively movable elements, a second control arm pivotally mounted upon the first-mentioned control arm, said arms being disposed to operate the control means, and a control-mass connected to the second-mentioned control arm.

9. A shock absorber for absorbing energy by providing a resisting force comprising, in combination, two relatively movable elements which co-act to provide a resisting force, control means associated with the relatively movable elements for controlling the magnitude of the resisting force, a control arm pivotally mounted upon one of the relatively movable elements, a second control arm pivotally mounted upon the first-mentioned control arm, said arms being disposed to operate the control means, and a control-mass connected to the second-mentioned control arm, and resilient means for stabilizing one of the said arms.

10. A shock absorber comprising, in combination, a cylinder, a hollow piston therein for subjecting a fluid to pressure, a valve assembly block mounted in one end of the hollow piston, valves mounted within the valve assembly block for controlling the pressure to which fluid is subjected, two pivotally mounted control arms for operating the valves, and a control-mass disposed in the other end of the hollow piston and connected to one of the control arms.

11. A shock absorber comprising, in combination, a cylinder, a hollow piston therein for subjecting a fluid to pressure, a valve assembly block mounted in one end of the hollow piston, valves mounted within the valve assembly block for controlling the pressure to which fluid is subjected, a control arm pivotally connected to the piston for operating the valves, a second control arm pivotally connected to the first-mentioned control arm for also operating the valves, a resilient member adapted to stabilize the first-mentioned control arm, and a control-mass disposed in the other end of the hollow piston and connected to the second-mentioned control arm.

12. A multiplying valve comprising, in combination, a high pressure valve having a stepped-stem, a piston connected to the stepped-stem, said stepped-stem and piston having a restricted opening therethrough, a cylinder for the piston, a low pressure valve communicating with the cylinder, and a spring biased valve communicating with the stepped-stem of the high pressure valve.

13. A multiplying valve comprising, in combination, a high pressure valve having a straight stem, a piston connected to the stem, said stem and piston having a restricted opening, a cylinder for the piston, a low pressure valve communicating with the cylinder, and a spring biased valve communicating with the straight stem of the high pressure valve.

CLINTON R. HANNA.